US008975828B2

(12) United States Patent  
Cao et al.

(10) Patent No.: US 8,975,828 B2  
(45) Date of Patent: Mar. 10, 2015

(54) DC BOOST TOPOLOGY CIRCUIT FOR BACKLIGHT DRIVING

(71) Applicant: Shenzhen China Star Optoelectronics Technology Co., LTD., Shenzhen, Guangdong Province (CN)

(72) Inventors: Dan Cao, Shenzhen (CN); Xiang Yang, Shenzhen (CN)

(73) Assignee: Shenzhen China Star Optoelectronics Technology Co., Ltd., Shenzhen, Guangdong Province (CN)

( * ) Notice: Subject to any disclaimer, the term of this patent is extended or adjusted under 35 U.S.C. 154(b) by 96 days.

(21) Appl. No.: 13/807,721

(22) PCT Filed: Nov. 25, 2012

(86) PCT No.: PCT/CN2012/085226  
§ 371 (c)(1),  
(2) Date: Dec. 28, 2012

(87) PCT Pub. No.: WO2014/075338  
PCT Pub. Date: May 22, 2014

(65) Prior Publication Data  
US 2014/0184091 A1    Jul. 3, 2014

(30) Foreign Application Priority Data

Nov. 15, 2012   (CN) .......................... 2012 1 0460615

(51) Int. Cl.  
    *H05B 37/02*    (2006.01)  
    *H05B 33/08*    (2006.01)  
    *H02M 3/335*    (2006.01)  
    *H05B 41/36*    (2006.01)

(52) U.S. Cl.  
    CPC ........... *H05B 33/0803* (2013.01); *H02M 3/335* (2013.01); *H05B 41/36* (2013.01); *H05B 33/0815* (2013.01)  
    USPC ........................... 315/291; 315/224; 315/274

(58) Field of Classification Search  
USPC ........... 363/20, 21, 21.12, 21.18, 61, 97, 147; 315/224, 274, 276, 291, 294  
See application file for complete search history.

(56) References Cited

U.S. PATENT DOCUMENTS

| | | | | |
|---|---|---|---|---|
| 4,890,210 | A | * | 12/1989 | Myers ......................... 363/21.11 |
| 6,577,512 | B2 | * | 6/2003 | Tripathi et al. ............. 363/21.17 |
| 7,911,814 | B2 | * | 3/2011 | Tao et al. .................... 363/21.12 |

(Continued)

FOREIGN PATENT DOCUMENTS

| | | |
|---|---|---|
| CN | 201422076 Y | 3/2010 |
| CN | 102123535 A | 7/2011 |

(Continued)

*Primary Examiner* — Tung X Le  
(74) *Attorney, Agent, or Firm* — Cheng-Ju Chiang

(57) ABSTRACT

The present invention provides a DC boost topology circuit for backlight driving, which includes a coupling inductor including a primary coil having an end connected to a DC voltage input terminal and an opposite end connected to a secondary coil and a field-effect transistor that has an end grounded. An energy storage module includes a first capacitor and a first diode. The secondary coil has an end connected to the first capacitor and an opposite end connected to an opposite end of the primary coil and the first diode of which an opposite end connected to an opposite end of the first capacitor. A circuit protection unit has an end connected to a common terminal of the first diode and the first capacitor and an opposite end connected to a DC voltage output terminal. The topology circuit has an output voltage that is multiple times of that of known circuits.

12 Claims, 2 Drawing Sheets

(56) References Cited

U.S. PATENT DOCUMENTS

2008/0088248 A1 4/2008 Myers
2011/0235371 A1* 9/2011 Liang .................... 363/21.12

FOREIGN PATENT DOCUMENTS

| CN | 201947184 U | 8/2011 |
| CN | 102403906 A | 4/2012 |
| TW | M423415 U1 | 2/2012 |

* cited by examiner

US 8,975,828 B2

DC BOOST TOPOLOGY CIRCUIT FOR BACKLIGHT DRIVING

BACKGROUND OF THE INVENTION

1. Field of the Invention

The present invention relates to the field of driving of backlight of liquid crystal panel, and in particular to a DC (Direct Current) boost topology circuit for backlight driving.

2. The Related Arts

An LED has advantages such as long lifespan and saving energy and thus, the LED lights are getting more popular as light sources for color LCD televisions. Since the LED lights are driven by constant current driving, in practical applications of LED, series connection is commonly adopted to connect a plurality of LED lights and driving with DC power is used.

In the state of the art, a DC-DC convertor (DC conversion) portion of backlight driving of a liquid crystal panel usually comprises a boost topology circuit to drive an LED light. As shown in FIG. 1, FIG. 1 is a schematic view showing a DC boost circuit for backlight driving of a liquid crystal panel in the state of the art. The circuit comprises a DC voltage input terminal Vin, a DC voltage output terminal Vout1, an inductor L1, a diode D1, a capacitor C1, a resistor R1, a field-effect transistor Q1, and three LED lights D3, D5, D7. Specifically, positive terminal of the DC voltage input terminal Vin is connected to an end of the inductor L1. The inductor L1 has an opposite end connected to an anode of the diode D1. Cathode of the diode D1 is connected to the DC voltage output terminal Vout1 and is also connected to an end of the capacitor C1. The capacitor C1 has another end connected to negative terminal of the DC voltage input terminal Vin. The field-effect transistor Q1 has a drain terminal connected between the inductor and the anode of the diode D1. The field-effect transistor Q1 has a source terminal connected to an end of the resistor R1 and an opposite end of the resistor R1 is grounded. The three LED lights D3, D5, D7 are connected in series and connected to the DC voltage output terminal Vout1.

In charging, the field-effect transistor Q1 serves as a conductive line and the DC voltage input terminal Vin stores energy in the inductor L1. The diode D1 prevents the capacitor from discharging to the ground. Since the input is a DC power, the electrical current of the inductor L1 is linearly increased by a predetermined ratio. This ratio is related to the size of the inductor L1. With the electrical current of the inductor L1 increasing, energy is stored in the inductor L1. In discharging, the field-effect transistor Q1 functions as an open loop. Due to the holding characteristic of electrical current of the inductor L1, the electrical current flowing through the inductor L1 does not turn immediately to 0 and is instead slowly changing from the value of being just charge to 0. Since the original circuit is open, the inductor L1 can only discharge through the circuit, meaning the inductor L1 starting to charge the capacitor C1. Under this condition, the voltage is higher than the input voltage so as to drive the LED lights.

However, in the conventional boost topology, Duty=1−Vin/Vout1, since the maximum value of Duty is limited, the maximum value of Vout1 in the topology is limited. This makes the driving capacity of Vout1 limited, meaning the maximum number of LEDs that are connected in series is limited. This makes the maximum luminance of the LED backlighting of a liquid crystal panel limited. Obviously, to provide an effective backlight driving circuit for a liquid crystal panel and to increase the maximum luminance of the backlight of the liquid crystal panel are issues that the present inventor and those devoted themselves in the industry must improve.

SUMMARY OF THE INVENTION

An object of the present invention is to provide a DC boost topology circuit for backlight driving, which increases the driving capacity of a topology circuit to increase the number of serially-connected LED lights so as to improve the luminance of a backlight source.

To achieve the object, the present invention provides a DC boost topology circuit for backlight driving, which comprises a DC voltage input terminal, a DC voltage output terminal, a coupling inductor, a field-effect transistor that is controllable by a PWM (Pulse Width Modulation) signal, a circuit protection unit, and an energy storage module. The coupling inductor comprises a primary coil and a secondary coil. The primary coil has an end electrically connected to the DC voltage input terminal and an opposite end electrically connected to the field-effect transistor. The energy storage module comprises a first capacitor and a first diode. The secondary coil has an end electrically connected to the first capacitor and an opposite end electrically connected to said opposite end of the primary coil and the first diode. The first diode has an opposite end electrically connected to an opposite end of the first capacitor. The circuit protection unit has an end connected to a common terminal of the first diode and the first capacitor and an opposite end connected to the DC voltage output terminal. The field-effect transistor has another end electrically connected to the ground line.

The primary coil comprises a first dotted terminal and a first non-dotted terminal. The first dotted terminal is connected to the DC voltage input terminal. The first non-dotted terminal is electrically connected to the field-effect transistor and the first diode. The secondary coil comprises a second dotted terminal and a second non-dotted terminal. The second dotted terminal is electrically connected to the first diode and the first non-dotted terminal of the primary coil. The second non-dotted terminal is electrically connected to the first capacitor.

The primary coil has Np turns of winding and the secondary coil 24 has Ns turns of winding, where Ns/Np>1.

The DC voltage output terminal supplies a voltage Vout2 and the value of Vout2 is determined by Ns/Np and is proportional to Ns/Np.

The first diode has a first anode and a first cathode. The first anode is electrically connected to the first non-dotted terminal of the primary coil, the dotted terminal of the secondary coil, and the field-effect transistor. The first cathode is electrically connected to the first capacitor and the circuit protection unit.

The field-effect transistor comprises a gate terminal, a source terminal, and a drain terminal. The drain terminal is electrically connected to the first non-dotted terminal of the primary coil, the second dotted terminal of the secondary coil, and the first anode of the first diode. The source terminal is electrically connected to the ground line. The gate terminal is externally connectable to a control source to receive a PWM signal applied to the field-effect transistor.

The circuit protection unit comprises a second diode, a first resistor, and a second capacitor. The second diode has a second anode and a second cathode. The first resistor is connected in series with the second capacitor so as to collectively form an end that is connected to the second anode of the second diode and an opposite end connected to the second cathode of the second diode. The second anode of the second diode is electrically connected to the first cathode of the first diode. The second cathode of the second diode is electrically connected to the DC voltage output terminal.

The DC boost topology circuit for backlight driving further comprises a third capacitor. The third capacitor has an end electrically connected to the DC voltage output terminal and an opposite end connected to the ground line.

The DC boost topology circuit for backlight driving further comprises a second resistor. The second resistor has an end electrically connected to the source terminal of the field-effect transistor and an opposite end electrically connected to the ground line.

The present invention also provides a DC boost topology circuit for backlight driving, comprising a DC voltage input terminal, a DC voltage output terminal, a coupling inductor, a field-effect transistor that is controllable by a PWM signal, a circuit protection unit, and an energy storage module, the coupling inductor comprising a primary coil and a secondary coil, the primary coil having an end electrically connected to the DC voltage input terminal and an opposite end electrically connected to the field-effect transistor, the energy storage module comprising a first capacitor and a first diode, the secondary coil having an end electrically connected to the first capacitor and an opposite end electrically connected to said opposite end of the primary coil and the first diode, the first diode having an opposite end electrically connected to an opposite end of the first capacitor, the circuit protection unit having an end connected to a common terminal of the first diode and the first capacitor and an opposite end connected to the DC voltage output terminal, the field-effect transistor having another end electrically connected to the ground line;

wherein the primary coil comprises a first dotted terminal and a first non-dotted terminal, the first dotted terminal being connected to the DC voltage input terminal, the first non-dotted terminal being electrically connected to the field-effect transistor and the first diode, the secondary coil comprising a second dotted terminal and a second non-dotted terminal, the second dotted terminal being electrically connected to the first diode and the first non-dotted terminal of the primary coil, the second non-dotted terminal being electrically connected to the first capacitor;

wherein the primary coil has Np turns of winding and the secondary coil 24 has Ns turns of winding, where Ns/Np>1;

wherein the DC voltage output terminal supplies a voltage Vout2 and the value of Vout2 is determined by Ns/Np and is proportional to Ns/Np;

wherein the first diode has a first anode and a first cathode, the first anode being electrically connected to the first non-dotted terminal of the primary coil, the dotted terminal of the secondary coil, and the field-effect transistor, the first cathode being electrically connected to the first capacitor and the circuit protection unit;

wherein the field-effect transistor comprises a gate terminal, a source terminal, and a drain terminal, the drain terminal being electrically connected to the first non-dotted terminal of the primary coil, the second dotted terminal of the secondary coil, and the first anode of the first diode, the source terminal being electrically connected to the ground line, the gate terminal being externally connectable to a control source to receive a PWM signal applied to the field-effect transistor;

wherein the circuit protection unit comprises a second diode, a first resistor, and a second capacitor, the second diode having a second anode and a second cathode, the first resistor being connected in series with the second capacitor so as to collectively form an end that is connected to the second anode of the second diode and an opposite end connected to the second cathode of the second diode, the second anode of the second diode being electrically connected to the first cathode of the first diode, the second cathode of the second diode being electrically connected to the DC voltage output terminal;

further comprising a third capacitor, the third capacitor having an end electrically connected to the DC voltage output terminal and an opposite end connected to the ground line; and further comprising a second resistor, the second resistor having an end electrically connected to the source terminal of the field-effect transistor and an opposite end electrically connected to the ground line.

The efficacy of the present invention is that the present invention provides a DC boost topology circuit for backlight driving, which makes use of the coupling effect of a coupling inductor to increase the output voltage of the topology circuit to multiple times of that of the conventional topology circuit and thus increasing the driving capacity of the topology circuit, increasing the number of LED lights available for series connection, thereby improving the luminance of backlight source.

For better understanding of the features and technical contents of the present invention, reference will be made to the following detailed description of the present invention and the attached drawings. However, the drawings are provided for the purposes of reference and illustration and are not intended to impose undue limitations to the present invention.

BRIEF DESCRIPTION OF THE DRAWINGS

The technical solution, as well as beneficial advantages, of the present invention will be apparent from the following detailed description of an embodiment of the present invention, with reference to the attached drawings. In the drawings.

DETAILED DESCRIPTION OF THE PREFERRED EMBODIMENTS

To further expound the technical solution adopted in the present invention and the advantages thereof, a detailed description is given to a preferred embodiment of the present invention and the attached drawings.

Figure 1:
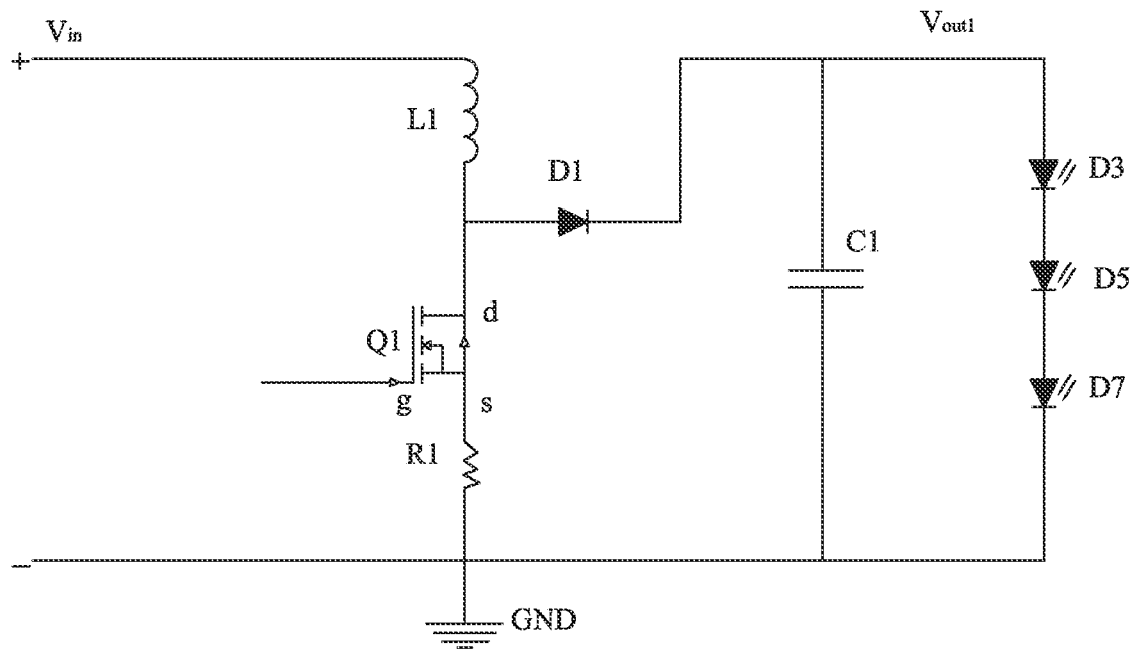
FIG. 1 is a schematic view showing the structure of a conventional DC boost circuit for backlight driving of liquid crystal panel.
Figure 2:
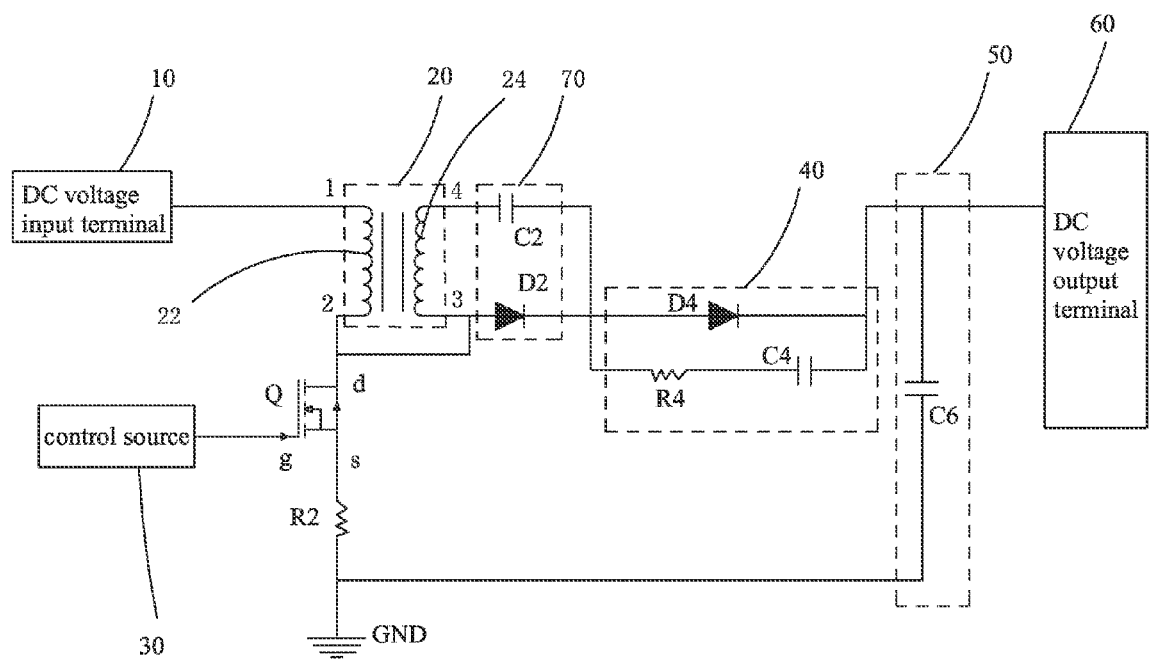
FIG. 2 is a schematic view showing the structure of DC boost topology circuit for backlight driving according to the present invention.

Referring to FIG. 2, the present invention provides a DC (Direct Current) boost topology circuit for backlight driving, which comprises a DC voltage input terminal 10, a DC voltage output terminal 60, a coupling inductor 20, a field-effect transistor Q that is controllable by a PWM (Pulse Width Modulation) signal, a circuit protection unit 40, and an energy storage module 70. The coupling inductor 20 comprises a primary coil 22 and a secondary coil 24. The primary coil 22 has an end electrically connected to the DC voltage input terminal 10 and an opposite end electrically connected to the field-effect transistor Q. The energy storage module 70 comprises a first capacitor C2 and a first diode D2. The secondary coil 24 has an end electrically connected to the first capacitor C2 and an opposite end electrically connected to said opposite end of the primary coil 22 and the first diode D2. The first diode D2 has an opposite end electrically connected to an opposite end of the first capacitor C2. The circuit protection unit 40 has an end connected to a common terminal of the first diode D2 and the first capacitor C2 and an opposite end connected to the DC voltage output terminal 60. The field-effect transistor Q has another end electrically connected to the ground line. Coupling effect of the coupling inductor 20 is thus used to increase the driving capacity of the DC boost topology circuit so as to increase the number of LEDs that the DC boost topology circuit can drive thereby improving the luminance of backlight source.

The primary coil 22 comprises a first dotted terminal 1 and a first non-dotted terminal 2. The first dotted terminal 1 is connected to the DC voltage input terminal 10 and the first non-dotted terminal 2 is electrically connected to the field-effect transistor Q and the first diode D2. The secondary coil 24 comprises a second dotted terminal 3 and a second non-dotted terminal 4. The second dotted terminal 3 is electrically connected to the first diode D2 and the first non-dotted terminal 2 of the primary coil 22. The second non-dotted terminal 4 is electrically connected to the first capacitor C2. The primary coil 22 has Np turns of winding and the secondary coil 24 has Ns turns of winding. The ratio of the two is Ns/Np>1. Thus, by increasing the ratio between the two, the driving capacity of the DC boost topology circuit is increased. The ratio, Ns/Np, is set according to practical needs.

The DC voltage output terminal supplies a voltage Vout2 and the value of Vout2 is determined by Ns/Np and is proportional to Ns/Np. Through using, in combination, the known technology described in the section of THE RELATED ART, the coupling effect of the coupling inductor gives the voltage Vout2=Vout1*Ns/Np. It is apparent that the output voltage Vout2 of the DC boost topology circuit is determined by the ratio between the turns of windings of the primary coil 22 and the secondary coil 24, namely Ns/Np. Increasing the driving capacity of the DC boost topology circuit can be achieved through an increase of the ratio of Ns/Np.

The first diode D2 has a first anode and a first cathode. The first anode is electrically connected to the first non-dotted terminal 2 of the primary coil 22, the dotted terminal 3 of the secondary coil 24, and the field-effect transistor Q. The first cathode is electrically connected to the first capacitor C2 and the circuit protection unit 40. The field-effect transistor Q comprises a gate terminal g, a source terminal d, and a drain terminal s. The drain terminal d is electrically connected to the first non-dotted terminal 2 of the primary coil 22, the second dotted terminal 3 of the secondary coil 24, and the first anode of the first diode D2. The source terminal s is electrically connected to the ground line. The gate terminal g is externally connectable to a control source 30 to receive a PWM signal applied to the field-effect transistor Q and thus controlling conduction or cutoff of the field-effect transistor Q.

The circuit protection unit 40 comprises a second diode D4, a first resistor R4, and a second capacitor C4. The second diode D4 has a second anode and a second cathode. The first resistor R4 is connected in series with the second capacitor C4 so as to collectively form an end that is connected to the second anode of the second diode D4 and an opposite end connected to the second cathode of the second diode D4. The second anode of the second diode D4 is electrically connected to the first cathode of the first diode D2. The second cathode of the second diode D4 is electrically connected to the DC voltage output terminal 60.

The DC boost topology circuit for backlight driving according to the present invention further comprises a third capacitor C6. The third capacitor C6 has an end electrically connected to the DC voltage output terminal 60 and an opposite end connected to the ground line to subject an output voltage of the DC voltage output terminal 60 to filtering thereby making the output voltage of the DC voltage output terminal stable.

The DC boost topology circuit for backlight driving according to the present invention further comprises a second resistor R2. The second resistor R2 has an end electrically connected to the source terminal s of the field-effect transistor Q and an opposite end electrically connected to the ground line. The second resistor R2 provides an effect of limiting current in the circuit. When the control source 30 output a high level, the field-effect transistor Q is conducted on so that the DC voltage input terminal 10, the primary coil 22 of the coupling inductor 20, the field-effect transistor Q, and the second resistor R2 form a loop in which the second resistor R2 provides an effect of limiting current and thus protecting the circuit.

With the control source 30 and the DC voltage input terminal 10 being on, when the control source 30 outputs a high level, the field-effect transistor Q is conducted on and the first and second diodes D2, D4 both are not on. The DC voltage input terminal 10, the primary coil 22 of the coupling inductor 20, the field-effect transistor Q, and the second resistor R2 form a loop in which the primary coil 22 of the coupling inductor 20 stores energy therein. When the control source 30 outputs a low level, the field-effect transistor Q is cut off and the coupling effect of the coupling inductor 20 provides, through the second diode D4 to the DC voltage output terminal 60 an output of DC voltage Vout2. This is equivalent to the DC voltage that is boosted to Vout1 with the technology described in the section of THE RELATED ARTS being subsequently subjected to the coupling effect of the transformer to obtain Vout2=Vout1*Ns/Np, in which Ns/Np is set according to practical needs. This means the driving capacity of Vout2 is Ns/Np times of that of Vout1.

In summary, the present invention provides a DC boost topology circuit for backlight driving, which makes use of the coupling effect of a coupling inductor to increase the output voltage of the topology circuit to multiple times of that of the conventional topology circuit and thus increasing the driving capacity of the topology circuit, increasing the number of LED lights available for series connection, thereby improving the luminance of backlight source.

Based on the description given above, those having ordinary skills of the art may easily contemplate various changes and modifications of the technical solution and technical ideas of the present invention and all these changes and modifications are considered within the protection scope of right for the present invention.

What is claimed is:

1. A Direct Current (DC) boost topology circuit for backlight driving, comprising a DC voltage input terminal, a DC voltage output terminal, a coupling inductor, a field-effect transistor that is controllable by a pulse-width modulation (PWM) signal, a circuit protection unit, and an energy storage module, the coupling inductor comprising a primary coil and a secondary coil, the primary coil having an end electrically connected to the DC voltage input terminal and an opposite end electrically connected to the field-effect transistor, the energy storage module comprising a first capacitor and a first diode, the secondary coil having an end electrically connected to the first capacitor and an opposite end electrically connected to said opposite end of the primary coil and the first diode, the first diode having an opposite end electrically connected to an opposite end of the first capacitor, the circuit protection unit having an end connected to a common terminal of the first diode and the first capacitor and an opposite end connected to the DC voltage output terminal, the field-effect transistor having another end electrically connected to the ground line;

wherein the primary coil comprises a first dotted terminal and a first non-dotted terminal, the first dotted terminal being connected to the DC voltage input terminal, the first non-dotted terminal being electrically connected to the field-effect transistor and the first diode, the secondary coil comprising a second dotted terminal and a second non-dotted terminal, the second dotted terminal being electrically connected to the first diode and the first non-dotted terminal of the primary coil, the second non-dotted terminal being electrically connected to the first capacitor.

2. The DC boost topology circuit for backlight driving as claimed in claim 1, wherein the primary coil has Np turns of winding and the secondary coil has Ns turns of winding, where Ns/Np>1.

3. The DC boost topology circuit for backlight driving as claimed in claim 2, wherein the DC voltage output terminal supplies a voltage Vout2 and the value of Vout2 is determined by Ns/Np and is proportional to Ns/Np.

4. The DC boost topology circuit for backlight driving as claimed in claim 1, wherein the first diode has a first anode and a first cathode, the first anode being electrically connected to the first non-dotted terminal of the primary coil, the dotted terminal of the secondary coil, and the field-effect transistor, the first cathode being electrically connected to the first capacitor and the circuit protection unit.

5. The DC boost topology circuit for backlight driving as claimed in claim 4, wherein the field-effect transistor comprises a gate terminal, a source terminal, and a drain terminal, the drain terminal being electrically connected to the first non-dotted terminal of the primary coil, the second dotted terminal of the secondary coil, and the first anode of the first diode, the source terminal being electrically connected to the ground line, the gate terminal being externally connectable to a control source to receive a PWM signal applied to the field-effect transistor.

6. The DC boost topology circuit for backlight driving as claimed in claim 1, wherein the circuit protection unit comprises a second diode, a first resistor, and a second capacitor, the second diode having a second anode and a second cathode, the first resistor being connected in series with the second capacitor so as to collectively form an end that is connected to the second anode of the second diode and an opposite end connected to the second cathode of the second diode, the second anode of the second diode being electrically connected to the first cathode of the first diode, the second cathode of the second diode being electrically connected to the DC voltage output terminal.

7. The DC boost topology circuit for backlight driving as claimed in claim 1 further comprising a third capacitor, the third capacitor having an end electrically connected to the DC voltage output terminal and an opposite end connected to the ground line.

8. The DC boost topology circuit for backlight driving as claimed in claim 7 further comprising a second resistor, the second resistor having an end electrically connected to the source terminal of the field-effect transistor and an opposite end electrically connected to the ground line.

9. A Direct Current (DC) boost topology circuit for backlight driving, comprising a DC voltage input terminal, a DC voltage output terminal, a coupling inductor, a field-effect transistor that is controllable by a pulse-width modulation (PWM) signal, a circuit protection unit, and an energy storage module, the coupling inductor comprising a primary coil and a secondary coil, the primary coil having an end electrically connected to the DC voltage input terminal and an opposite end electrically connected to the field-effect transistor, the energy storage module comprising a first capacitor and a first diode, the secondary coil having an end electrically connected to the first capacitor and an opposite end electrically connected to said opposite end of the primary coil and the first diode, the first diode having an opposite end electrically connected to an opposite end of the first capacitor, the circuit protection unit having an end connected to a common terminal of the first diode and the first capacitor and an opposite end connected to the DC voltage output terminal, the field-effect transistor having another end electrically connected to the ground line;

wherein the primary coil comprises a first dotted terminal and a first non-dotted terminal, the first dotted terminal being connected to the DC voltage input terminal, the first non-dotted terminal being electrically connected to the field-effect transistor and the first diode, the secondary coil comprising a second dotted terminal and a second non-dotted terminal, the second dotted terminal being electrically connected to the first diode and the first non-dotted terminal of the primary coil, the second non-dotted terminal being electrically connected to the first capacitor;

wherein the primary coil has Np turns of winding and the secondary coil has Ns turns of winding, where Ns/Np>1;

wherein the DC voltage output terminal supplies a voltage Vout2 and the value of Vout2 is determined by Ns/Np and is proportional to Ns/Np;

wherein the first diode has a first anode and a first cathode, the first anode being electrically connected to the first non-dotted terminal of the primary coil, the dotted terminal of the secondary coil, and the field-effect transistor, the first cathode being electrically connected to the first capacitor and the circuit protection unit;

wherein the field-effect transistor comprises a gate terminal, a source terminal, and a drain terminal, the drain terminal being electrically connected to the first non-dotted terminal of the primary coil, the second dotted terminal of the secondary coil, and the first anode of the first diode, the source terminal being electrically connected to the ground line, the gate terminal being externally connectable to a control source to receive a PWM signal applied to the field-effect transistor;

wherein the circuit protection unit comprises a second diode, a first resistor, and a second capacitor, the second diode having a second anode and a second cathode, the first resistor being connected in series with the second capacitor so as to collectively form an end that is connected to the second anode of the second diode and an opposite end connected to the second cathode of the second diode, the second anode of the second diode being electrically connected to the first cathode of the first diode, the second cathode of the second diode being electrically connected to the DC voltage output terminal;

further comprising a third capacitor, the third capacitor having an end electrically connected to the DC voltage output terminal and an opposite end connected to the ground line; and further comprising a second resistor, the second resistor having an end electrically connected to the source terminal of the field-effect transistor and an opposite end electrically connected to the ground line.

10. A Direct Current (DC) boost topology circuit for backlight driving, comprising a DC voltage input terminal, a DC voltage output terminal, a coupling inductor, a field-effect transistor that is controllable by a pulse-width modulation (PWM) signal, a circuit protection unit, and an energy storage module, the coupling inductor comprising a primary coil and a secondary coil, the primary coil having an end electrically connected to the DC voltage input terminal and an opposite end electrically connected to the field-effect transistor, the energy storage module comprising a first capacitor and a first diode, the secondary coil having an end electrically connected to the first capacitor and an opposite end electrically connected to said opposite end of the primary coil and the first diode, the first diode having an opposite end electrically connected to an opposite end of the first capacitor, the circuit protection unit having an end connected to a common terminal of the first diode and the first capacitor and an opposite end connected to the DC voltage output terminal, the field-effect transistor having another end electrically connected to the ground line;

wherein the circuit protection unit comprises a second diode, a first resistor, and a second capacitor, the second diode having a second anode and a second cathode, the first resistor being connected in series with the second capacitor so as to collectively form an end that is connected to the second anode of the second diode and an opposite end connected to the second cathode of the second diode, the second anode of the second diode being electrically connected to the first cathode of the first diode, the second cathode of the second diode being electrically connected to the DC voltage output terminal.

11. The DC boost topology circuit for backlight driving as claimed in claim 10 further comprising a third capacitor, the third capacitor having an end electrically connected to the DC voltage output terminal and an opposite end connected to the ground line.

12. The DC boost topology circuit for backlight driving as claimed in claim 11 further comprising a second resistor, the second resistor having an end electrically connected to the source terminal of the field-effect transistor and an opposite end electrically connected to the ground line.

\* \* \* \* \*